(12) United States Patent
Short et al.

(10) Patent No.: US 8,158,703 B2
(45) Date of Patent: Apr. 17, 2012

(54) PAINTABLE PRIMER SYSTEM

(75) Inventors: Gerard Short, Hinchinbrook (AU);
Boris Bobyreff, Campbelltown (AU);
Peter Jackson, Castle Hill (AU)

(73) Assignee: Poly Coat Pty. Ltd., New South Wales (AU)

( * ) Notice: Subject to any disclaimer, the term of this patent is extended or adjusted under 35 U.S.C. 154(b) by 676 days.

(21) Appl. No.: 10/591,313

(22) PCT Filed: Mar. 2, 2005

(86) PCT No.: PCT/AU2005/000300
§ 371 (c)(1),
(2), (4) Date: Jul. 23, 2007

(87) PCT Pub. No.: WO2005/085341
PCT Pub. Date: Sep. 15, 2005

(65) Prior Publication Data
US 2008/0207810 A1 Aug. 28, 2008

(30) Foreign Application Priority Data
Mar. 2, 2004 (AU) ................................ 2004901038

(51) Int. Cl.
*C08L 67/00* (2006.01)
(52) U.S. Cl. ........................................ 524/401; 524/502
(58) Field of Classification Search .................. 524/401, 524/502
See application file for complete search history.

(56) References Cited

U.S. PATENT DOCUMENTS

| | | |
|---|---|---|
| 3,247,006 A | 4/1966 | Hoge et al. |
| 3,953,386 A | 4/1976 | Vincent et al. |
| 3,959,193 A | 5/1976 | Putman et al. |
| 4,055,698 A | 10/1977 | Beery et al. |
| 4,749,564 A | 6/1988 | Faryniarz et al. |
| 5,298,552 A | 3/1994 | Borghi et al. |
| 5,412,000 A | 5/1995 | Hellmann et al. |
| 2004/0175424 A1 | 9/2004 | Castan et al. |

FOREIGN PATENT DOCUMENTS

| | | |
|---|---|---|
| CN | 1474687 A | 2/2004 |
| EP | 1505129 A1 | 2/2005 |
| GB | 1533652 | 11/1978 |
| GB | 2339785 A | 2/2000 |
| JP | 61-111375 | 5/1986 |
| JP | 11-172153 A2 | 6/1999 |
| RU | 2088620 C1 | 8/1997 |
| WO | WO 99/25776 A1 | 5/1999 |
| WO | WO 00/71359 A1 | 11/2000 |
| WO | WO 01/35719 * | 5/2001 |
| WO | WO 01/35719 A2 | 5/2001 |

OTHER PUBLICATIONS

Payne, Organic Coating Technology, vol. 1, p. 240.*
Payne, H.F. Organic Coating Technology, John Wiley and Sons, Inc., 1954, vol. 1, ISBN 0471672866, p. 240 (See p. 240, last paragraph).
Office Action from Chinese Patent Application No. 200580014162. X, dated May 22, 2009.
Office Action from Russian Patent Application No. 2006134651/ 04(037702) dated Jun. 28, 2010.
Supplemental European Search Report dated Sep. 29, 2011 for corresponding European Application No. EP 05706334.

* cited by examiner

*Primary Examiner* — Robert D. Harlan
(74) *Attorney, Agent, or Firm* — Knobbe Martens Olson & Bear LLP

(57) ABSTRACT

A paintable primer composition comprising a dispersion, or chip is disclosed. the chip is produced from a dispersion comprising a thermoplastic polymer, a phthalate ester of a $C_1$-$C_6$ alkylated aromatic alcohol, a surfactant and other components selected from a metal carbonate, a white metal oxide pigment, an alkaline earth metal salt of a $C_9$-$C_{20}$ aliphatic fatty acid, a lower alkyl methacrylate polymer, a solvent and a rust inhibitor. The paintable primer composition is particularly suitable for painting surfaces, such as metals, composite materials and thermoplastic polyolefins including polyethylene, polypropylene, polystyrene, thermoplastic elastomer or ethylene-propylene rubbers. Painting of polyethylene surfaces may be assisted by precoating with an adhesion promoter comprising an aromatic hydrocarbon, a co-polymer of a $C_2$-$C_6$ alkene and a vinyl ester and a chlorinated polyolefin.

24 Claims, No Drawings

PAINTABLE PRIMER SYSTEM

This application is U.S. National Phase of International Application PCT/AU2005/000300, filed Mar. 2, 2005 designating the U.S., and published in English as WO 2005/085341 on Sep. 15, 2005, which claims priority to Australian Patent Application No. 2004901038, filed Mar. 2, 2004.

FIELD OF THE INVENTION

The present invention relates to a paintable primer system particularly for use in the coating of surfaces, including but not limited to, thermoplastic polyolefin surfaces, metal surfaces and composite surfaces. The invention also relates to paintable primer systems suitable for applying to a polyethylene surface.

BACKGROUND OF THE INVENTION

Coating is typically used to improve an article's durability, corrosion resistance, visibility and appearance. Examples of materials that require coating include thermoplastic polyolefins (TPOs), metals and composites, including but not limited to, those metals and composite materials used in the auto, marine and aviation industries. Some of the materials that require coating present challenges to coating, such as being difficult to coat, requiring multiple coats or requiring pretreatment of the material.

TPO's such as polyethylene, polypropylene (PP), polystyrene (PS), thermoplastic elastomer (TPE) or ethylene-propylene rubbers have steadily grown in use as a material of construction for a large array of consumer goods. In particular, polyethylene (PE) is used in the manufacture of toys, containers, packing films, household appliances, and in particular, the automotive industry as it exhibits the primary properties of being relatively inert, flexible, impermeable to water vapour, light weight, durable and is produced at a relatively low cost.

However as PE is non-polar, it is reluctant to accept a coating of paint or decorative print coating. Most paints are polar, and thus require a surface with some degree of surface polarity before they can adhere to it with any degree of desirable adherence. Conventional approaches to this problem have had limited success.

One approach to enhancing the paintability of a TPO surface or substrate is to subject it to physical or chemical etching. For example, the outside surface of PE water tanks are either lightly sanded or flame treated to remove the waxy, glossy surface prior to painting. Alternatively, the TPO surface or substrate may be irradiated with a plasma. A variation to this method is taught in JP59114039A2, whereby a primer is applied to a non-vulcanised rubber substrate and dried prior to irradiation. While generally effective, these methods are complex in nature and are more difficult to control in terms of quality and consistency across the surface. In addition, these techniques are generally more expensive than other alternatives.

Another approach is to apply several primer coats to a TPO substrate. While such primers are generally recognized as effective over short durations, they are expensive and their application is an extra step in the finishing of the manufactured TPO article. In addition, primer systems require multiple coats and still lack sufficient bonding strength to maintain adherence to the TPO substrate over time. Known primer compositions are unable to achieve satisfactory adhesion, resulting in peeling or chipping of the primer and/or covering paint over time.

As conventional primers have had limited success, more recent techniques have been to modify the physical and/or chemical properties of the TPO per se (e.g. as taught in WO 9325617). This can be achieved either by blending the thermoplastic polyolefin with other thermoplastic polymers, or by grafting functionalised groups to one or more polar groups along the polymeric backbone. While this approach has been successful, it is complex and can only be applied to existing substrates at the time of manufacture.

Metals and composite materials, including but not limited to metals and composites used in the auto, marine and aviation industries, also require coating.

OBJECT OF THE INVENTION

Accordingly, it is an object of the invention to provide a paintable primer system suitable for applying to surfaces which overcomes or alleviates one or more of the problems of the prior art or provides a useful commercial alternative.

SUMMARY OF THE INVENTION

Until now, known primer compositions have achieved only partial and/or extremely short term paint adhesion to surfaces such as thermoplastic polyolefins, metals and composite materials. The present invention is predicated upon a novel paintable primer system with adhesion suitable for use on various thermoplastic polyolefins, metals and composite materials.

According to a first aspect of the invention there is provided a dispersion comprising:
a thermoplastic polymer,
a phthalate ester of a $C_1$-$C_6$ alkylated aromatic alcohol,
a surfactant and further comprising one or more components selected from the group consisting of:
a metal carbonate,
a white metal oxide,
an alkaline earth metal salt of a $C_9$-$C_{20}$ aliphatic fatty acid,
a solvent,
a rust inhibitor, and
a lower alkyl methacrylate polymer.

In a first embodiment of the first aspect the lower alkyl methacrylate polymer is an ethyl methacrylate polymer.

In a second embodiment of the first aspect the dispersion comprises a thermoplastic polymer, a phthalate ester of a $C_1$-$C_6$ alkylated aromatic alcohol, a metal carbonate, a white metal oxide pigment, an alkaline earth metal salt of a $C_9$-$C_{20}$ aliphatic fatty acid, a lower alkyl methacrylate polymer, a surfactant and a solvent.

In a third embodiment of the first aspect the dispersion comprises a thermoplastic polymer, a phthalate ester of a $C_1$-$C_6$ alkylated aromatic alcohol, a white metal oxide pigment, a surfactant, and a solvent.

In a fourth embodiment of the first aspect the dispersion comprises a thermoplastic polymer, a phthalate ester of a $C_1$-$C_6$ alkylated aromatic alcohol, a metal carbonate, a white metal oxide, an alkaline earth metal salt of a $C_9$-$C_{20}$ aliphatic fatty acid, a lower alkyl methacrylate polymer, a surfactant, a solvent and a rust inhibitor.

In a fifth embodiment of the first aspect the dispersion is in a solid form.

In a sixth embodiment of the first aspect the dispersion is in a solid granulated form.

In a second aspect there is provided a primer comprising the dispersion of the fifth embodiment of the first aspect and a primer solvent.

In a first embodiment of the second aspect the primer comprises a component selected from the group consisting of: a lower alkyl methacrylate polymer, a $C_1$-$C_6$ ketone, a $C_1$-$C_6$ ester, a phthalate ester of a $C_1$-$C_6$ alkylated aromatic alcohol, a halogenated polyolefin, and a polymeric plasticizer.

In a second embodiment of the second aspect the primer further comprises a component selected from the group consisting of: an alcohol, a thermoplastic polymer, a polyhydroxy magnesium silicate derivate, and a silicon dioxide powder.

In a third aspect there is provided a primer comprising a solvent, a lower alkyl methacrylate polymer, a $C_1$-$C_6$ ketone, a $C_1$-$C_6$ ester, a phthalate ester of a $C_1$-$C_6$ alkylated aromatic alcohol, a polymeric plasticizer, a halogenated polyolefin, the dispersion of the second embodiment of the first aspect, and the dispersion of the third embodiment of the first aspect.

In a fourth aspect there is provided a primer comprising a solvent, a lower alkyl methacrylate polymer, a $C_1$-$C_6$ ketone, a $C_1$-$C_6$ ester, a phthalate ester of a $C_1$-$C_6$ alkylated aromatic alcohol, a polymeric plasticizer, a halogenated polyolefin, the dispersion of the second embodiment of the first aspect, the dispersion of the third embodiment of the first aspect and the dispersion of the fourth embodiment of the first aspect.

In a fifth aspect there is provided a primer comprising a solvent, a lower alkyl methacrylate polymer, a $C_1$-$C_6$ ketone, a $C_1$-$C_6$ ester, a phthalate ester of a $C_1$-$C_6$ alkylated aromatic alcohol, an alcohol, a thermoplastic polymer, a polyhydroxy magnesium silicate derivate, a silicon dioxide powder, a polymeric plasticizer, a halogenated polyolefin, the dispersion of the second embodiment of the first aspect, and the dispersion of the third embodiment of the first aspect.

In a sixth aspect there is provided an adhesion promoter comprising an aromatic hydrocarbon, a co-polymer of a $C_2$-$C_6$ alkene and a vinyl ester and a chlorinated polyolefin.

In a seventh aspect there is provided a method of manufacturing a primer including the steps of:
mixing a first primer solution in a first vessel;
mixing a second primer solution comprising the solid dispersion of the fifth embodiment of the first aspect in a second vessel;
mixing the first primer solution and the second primer solution together to form the primer.

In an eighth aspect there is provided a method of manufacturing a primer comprising:
mixing a first primer solution comprising a primer solvent and a lower alkyl methacrylate polymer;
mixing a second primer solution comprising a $C_1$-$C_6$ ketone, a $C_1$-$C_6$ ester, a phthalate ester of a $C_1$-$C_6$ alkylated aromatic alcohol, and the dispersion of the first aspect; and
mixing the first primer solution and the second primer solution together with a $C_1$-$C_6$ ester, a $C_1$-$C_6$ ketone, a primer solvent, a polymeric plasticizer, and a halogenated polyolefin to form the primer.

In a first embodiment of the eighth aspect the second primer solution comprises the dispersion of the second embodiment of the first aspect, and the dispersion of the third embodiment of the first aspect.

In a second embodiment of the eighth aspect the second primer solution comprises the dispersion of the second embodiment of the first aspect, the dispersion of the third embodiment of the first aspect and the dispersion of the fourth embodiment of the first aspect.

In a ninth aspect of the invention there is provided a method for coating a surface of an article comprising:
coating the surface with the adhesion promoter of the sixth aspect; and
coating the surface with the primer of the fifth embodiment of the first aspect.

In a tenth aspect there is provided an article coated with the primer of the second aspect.

Preferably, articles for coating with the dispersions, adhesion promoter, and primers of the invention comprise thermoplastic polyolefins, metals, or composite materials.

As used herein, "paint", "painting" and "painted" is meant a coat, covering or decoration using a liquid mixture, usually containing a solid pigment in a liquid vehicle and is used as a decorative or protective coating and that which forms a thin dry film when applied to a surface.

As used herein, "low molecular weight" is meant the sum of the atomic weights (International Atomic Weights) of the atoms in the molecule of up to 250 grams/mole.

In this specification, the terms "comprises", "comprising" or similar terms are intended to mean a non-exclusive inclusion, such that a method, system or apparatus that comprises a list of elements does not include those elements solely, but may well include other elements not listed.

DETAILED DESCRIPTION

The present invention resides in a novel paintable primer system which binds to surfaces with high bonding strength. Apart from cleaning, the primers of the present invention do not require any pre-treatment of the surface to be coated. To further improve the high-bonding strength of the primers a manual mechanism, such as scouring, may be used. Advantageously, application of an adhesion promoter followed by a primer containing one or more dispersions is suitable for application to PE, PP and other plastic substrates and metals. The primer may be applied to PP, other plastic substrates and metals without the need for the adhesion promoter whist still providing suitable adhesion.

The invention provides one or more dispersions or solid dispersion "chips". It will be appreciated that in formulating either a first 180/9101, second 180/9020, or third 180/9103 chip, a number of substituted agents may be used.

It is understood that the dispersions are manufactured from components in liquid, solid and/or semi-solid (e.g. resin) form. The components can be mixed and processed into a solid "chip". The dispersion may be provided as a product in a solid "chip" form, other solid form, a semi-solid form or a liquid form.

All examples provided below are non-limiting and provided for guidance. It is appreciated that each of the components can be varied within 30% of the stated amount, more preferably within 25% of the stated amount, more preferably within 20% of the stated amount, more preferably within 15% of the stated amount, more preferably within 10% of the stated amount and even more preferably within 5% of the stated amount.

A person of skill in the art readily understand that when varying the percentage of one or more component the percentage of the other components must be varied accordingly so that the sum of the components equals 100%.

General Dispersion or 'Chip' Formulation

The general dispersion or chip formulation comprises a thermoplastic polymer, a phthalate ester of a $C_1$-$C_6$ alkylated aromatic alcohol and a surfactant.

Thermoplastic polymer includes any thermoplastic cellulose polymer and any thermoplastic polymer of a cellulose derivative. The thermoplastic polymer may be selected from cellulose acetate, cellulose propionate and cellulose acetate butyrate. Preferably the thermoplastic polymer is cellulose acetate butyrate. Preferably the cellulose acetate butyrate is provided in the form of the commercially available CAB 381-2 polymer available from and manufactured by Eastman Chemical International Limited.

The phthalate ester of a $C_1$-$C_6$ alkylated aromatic alcohol is preferably butyl benzyl phthalate. A suitable commercially available butyl benzyl phthalate is Santicizer®160, available from Monsanto.

A variety of surfactants may be used. The surfactant may be cationic, anionic or non-ionic. Preferably the surfactant is a cationic surfactant such as an amino derivative of a glycerol ester of a long chain fatty acid. Suitably, the surfactant is tallowpropane diamine dioleate.

Supplementary Components for the Dispersion Formulation

The dispersion formulation may also comprise additional components such as a metal carbonate, a white metal oxide, an alkaline earth metal salt of a $C_9$-$C_{20}$ aliphatic fatty acid, a lower alkyl methacrylate polymer, a solvent and a rust inhibitor.

The metal carbonate may be any metal carbonate, e.g. carbonates of lithium, sodium, potassium, magnesium, and calcium. Preferably the metal carbonate is calcium carbonate. The calcium carbonate may be provided in the form of hakuenka cc manufactured by Shiraishi Kogyo Kaisha, Ltd., available in Australia from Chemiplas P/L.

If a white metal oxide pigment is to be used in the dispersion it may take the form of any white metal oxide, e.g. oxides and dioxides of zinc, manganese and aluminium and white "d-block" metal dioxides. Suitable metal oxides include titanium dioxide such as the commercially available White RCL 575 available from Tioxide P/L or Tiona RCL 575 available from Millennium Chemicals P/L.

The alkaline earth metal salt of a $C_9$-$C_{20}$ aliphatic fatty acid may be any stearate or other octadecanoic acid of an alkaline earth metal. Preferably, the stearate is a calcium salt.

The lower alkyl methacrylate polymer may be a polymer of a lower alkylmethacrylate or a polymer of a lower alkyl methacrylate derivative. By "lower alkyl" is meant $C_1$-$C_4$ alkyl. Preferably, the lower alkyl methacrylate polymer is an ethyl methacrylate polymer. The lower alkyl methacrylate polymer can be a homopolymer, a copolymer or an acrylic polymer. Suitable acrylic polymers may be selected from the Paraloid® and Plexigum® family of resins and the commercially available Paraloid® B72, Plexigum® N743 and Plexigum® N742 are suitable. Paraloid® B72, Plexigum®& N743 and Plexigum® N742 are available from Röhm GmbH & Co., KG D-64275 Darmstadt Germany. Degalan P65/12 is also a suitable polymer and is available from Röhm GmbH & Co., KG D-64275 Darmstadt Germany and also available from Degussa Australia P/L.

Solvents selected from solvents based on a glycol ester or a glycol derivative or low molecular weight ($C_1$-$C_6$) ketones based on propanones, butanones and pentanones may be used as the solvent. Suitably, the solvent is selected from one or more of methyl iso butyl ketone, methyl ethyl ketone, ethyl acetate, ethanol and isopropyl alcohol. Preferably, the solvent is methyl ethyl ketone or ethyl acetate.

The rust inhibitor may be any metal hydroxy phosphite selected from an alkaline earth metal hydroxy phosphite compound and metal tannates and metal derivatives of phosphoric acid. Preferably the rust inhibitor is a zinc hydroxy compound such as Nalzin 2. Nalzin 2 is available from Rheox Inc. Co and distributed in Australia by ISM P/L.

First Dispersion Formulation (180/9101)

The first dispersion comprises a metal carbonate, a white metal oxide pigment, an alkaline earth metal salt of a $C_9$-$C_{20}$ aliphatic fatty acid, a thermoplastic polymer, a lower alkyl methacrylate polymer, a phthalate ester of a $C_1$-$C_6$ alkylated aromatic alcohol, a surfactant, and a solvent all as described above.

Preferably, the metal carbonate is calcium carbonate present between 19.175 and 10.325 parts by weight of the dispersion. More preferably, the metal carbonate is present between 17.7 and 11.8 parts by weight and more preferably, between 16.225 and 13.275 parts by weight of the dispersion. More preferably still the metal carbonate is present at 14.75 parts by weight of the dispersion.

Preferably, the white metal oxide is titanium dioxide such as the commercially available White RCL 575. Preferably, the white metal oxide is present between 8.229 and 4.431 parts by weight of the dispersion. More preferably, the white metal oxide is present between 7.596 and 5.064 parts by weight and even more preferably between 6.963 and 5.697 parts by weight of the dispersion. More preferably the white metal oxide is present at 6.33 parts by weight of the dispersion.

Preferably, the alkaline earth metal salt of a $C_9$-$C_{20}$ aliphatic fatty acid is calcium stearate present between 0.455 and 0.245 parts by weight of the dispersion, more preferably between 0.42 and 0.28 parts by weight, more preferably between 0.385 and 0.315 parts by weight and more suitably, is present at approximately 0.35 parts by weight of the dispersion.

Preferably, the thermoplastic polymer, is cellulose acetate butyrate, present between 2.782 and 1.498 parts by weight of the dispersion and more preferably, between 2.568 and 1.712 parts by weight. Still more preferably, the thermoplastic polymer is present between 2.354 and 1.916 parts by weight of the dispersion and preferably still, is present at 2.14 parts by weight of the dispersion.

Preferably, the lower alkyl methacrylate polymer is Plexigum® N743 present between 2.782 and 1.498 parts by weight of the dispersion. Preferably, the lower alkyl methacrylate polymer is present between 2.568 and 1.712 parts by weight and more preferably, between 2.354 and 1.916 parts by weight of the dispersion. Preferably still, the lower alkyl methacrylate polymer is present at 2.14 parts by weight of the dispersion.

The phthalate ester of a $C_1$-$C_6$ alkylated aromatic alcohol is preferably butyl benzyl phthalate present between 1.17 and 0.63 parts by weight of the dispersion. More preferably, the phthalate ester of a $C_1$-$C_6$ alkylated aromatic alcohol is present between 1.08 and 0.72 parts by weight, more preferably between 0.99 and 0.81 parts by weight and even more preferably, is present at 0.9 parts by weight of the dispersion.

Preferably the surfactant is tallowpropane diamine dioleate present between 0.221 and 0.119 parts by weight of the dispersion. More preferably the surfactant is present between 0.204 and 0.136 parts by weight, more preferably is present between 0.187 and 0.153 parts by weight and still more preferably is present at 0.2 parts by weight of the dispersion.

Preferably the solvent is methyl ethyl ketone present between 3.64 and 1.96 parts by weight of the dispersion. Preferably, the ketone is present between 3.36 and 2.24 parts by weight and even more preferably, between 3.08 and 2.52 parts by weight of the dispersion. Still more preferably, the ketone is present at 2.8 parts by weight of the dispersion.

Second Dispersion Formulation (180/9020)

The second dispersion comprises a white metal oxide pigment, a thermoplastic polymer, a phthalate ester of a $C_1$-$C_6$ alkylated aromatic alcohol, a surfactant, and a solvent all as described above.

Preferably the white metal oxide pigment is titanium dioxide present between 32.5 and 17.5 parts by weight of the dispersion. Preferably, the white metal oxide pigment is present between 30 and 20 parts by weight and more preferably, between 27.5 and 22.5 parts by weight of the dispersion. Still preferably, the dioxide is present at 25 parts by weight of the dispersion.

Preferably the thermoplastic polymer is cellulose acetate butyrate present between 8.45 and 4.55 parts by weight of the dispersion and more preferably, between 7.8 and 5.2 parts by weight of the dispersion. Even more preferably, the thermoplastic polymer is present between 7.15 and 5.85 parts by weight and still preferably, is present at 6.5 parts by weight of the dispersion.

Preferably the phthalate ester of a $C_1$-$C_6$ alkylated aromatic alcohol is butyl benzyl phthalate present between 2.08 and 1.12 parts by weight of the dispersion and more preferably, between 1.92 and 1.28 parts by weight of the dispersion. Even more preferably, the phthalate ester of a $C_1$-$C_6$ alkylated aromatic alcohol is present between 1.76 and 1.44 parts by weight of the dispersion and still more preferably, is present at 1.6 parts by weight of the dispersion.

Preferably the surfactant is tallowpropane diamine dioleate present between 0.325 and 0.175 parts by weight of the dispersion. More preferably, the surfactant is present between 0.3 and 0.2 parts by weight, more preferably between 0.275 and 0.225 parts by weight and even more preferably the surfactant is present at 0.25 parts by weight of the dispersion.

Preferably the solvent is present between 4.94 and 2.66 parts by weight of the dispersion. More suitably the solvent is present between 4.56 and 3.04 parts by weight of the dispersion and even more suitably is present between 4.18 and 3.42 parts by weight of the dispersion. Still more suitably the solvent is present at 3.8 parts by weight of the dispersion.

Preferably the solvent comprises methyl ethyl ketone, ethanol and isopropyl alcohol. Preferably the methyl ethyl ketone is present between 0.78 and 0.42 parts by weight of the dispersion. More suitably, the methyl ethyl ketone is present between 0.72 and 0.48 parts by weight of the dispersion and even more suitably, is present between 0.66 and 0.54 parts by weight of the dispersion. Still more suitably, the methyl ethyl ketone is present at 0.6 parts by weight of the dispersion.

Preferably the isopropyl alcohol is present between 1.56 and 0.84 parts by weight of the dispersion and more preferably, between 1.44 and 0.96 parts by weight of the dispersion. Even more preferably, the isopropyl alcohol is present between 1.32 and 1.08 parts by weight of the dispersion and still preferably, is present at 1.2 parts by weight of the dispersion.

Preferably the ethanol is present between 2.6 and 1.4 parts by weight of the dispersion. Still more preferably, ethanol is present between 2.4 and 1.6 parts by weight of the dispersion and even more preferably, between 2.2 and 1.8 parts by weight of the dispersion. Preferably still, ethanol is present at 2 parts by weight of the dispersion.

Third Dispersion Formulation (180/9103)

The third dispersion formulation comprises a metal carbonate, and an alkaline earth metal salt of a $C_9$-$C_{20}$ aliphatic fatty acid of type and amount as described above for the first dispersion formulation (180/9101).

The third dispersion formulation also contains a white metal oxide of the type described for the first dispersion formulation. In the third dispersion formulation the white metal oxide is preferably present between 5.2 and 2.8 parts per weight of the dispersion, more preferably between 4.8 and 3.2 parts per weight of the dispersion, and still more preferably between 4.4 and 3.6 parts per weight of the dispersion. More preferably the white metal oxide is present at 4.0 parts by weight of the dispersion.

The third dispersion formulation also contains a thermoplastic polymer of the type described for the first dispersion formulation. In the third dispersion formulation the thermoplastic polymer is preferably present between 2.847 and 1.533 parts per weight of the dispersion, more preferably between 2.628 and 1.752 parts per weight of the dispersion, and still more preferably between 2.409 and 1.971 parts per weight of the dispersion, and even more preferably in an amount of 2.19 parts per weight.

The third formulation also contains a lower alkyl methacrylate polymer, preferably Degalan LP65/12. In the third dispersion formulation the lower alkyl methacrylate polymer is preferably present between 2.847 and 1.533 parts per weight of the dispersion, more preferably between 2.628 and 1.752 parts by weight of the dispersion, and still more preferably between 2.409 and 1.971 parts per weight of the dispersion, and even more preferably in an amount of 2.2 parts per weight of the dispersion.

The third dispersion formulation also contains a phthalate ester of a $C_1$-$C_6$ alkylated aromatic alcohol of the type described for the general dispersion or 'chip' formulation above. In the third dispersion formulation the phthalate ester of a $C_1$-$C_6$ alkylated aromatic alcohol is preferably present between 1.209 and 0.651 parts by weight, more preferably between 1.116 and 0.744 parts by weight, and more preferably between 1.023 and 0.837 parts by weight. Even more preferably the phthalate ester of a $C_1$-$C_6$ alkylated aromatic alcohol is present in the third dispersion in an amount of 0.93 parts by weight.

Additionally, the third formulation also contains a surfactant of the type described for the general dispersion or 'chip' formulation above. In the third dispersion formulation the surfactant is preferably present between 0.195 and 0.105 parts by weight of the dispersion, more preferably present between 0.18 and 0.12 parts by weight of the dispersion and more preferably present between 0.165 and 0.135 parts by weight of the dispersion. More preferably still the surfactant is present at 0.15 parts by weight of the dispersion.

The third dispersion also contains a solvent, as described for the supplementary components for the dispersion formulation above. Preferably the solvent is ethyl acetate present between 2.6 and 1.4 parts by weight of the dispersion. Preferably, the solvent is present between 2.4 and 1.6 parts by weight and even more preferably, between 2.2 and 1.8 parts by weight of the dispersion. Still more preferably, the solvent is present at 2.0 parts by weight of the dispersion.

Additionally, the third dispersion formulation comprises a rust inhibitor as described in the supplementary components for the dispersion formulation above. Preferably the rust inhibitor is zinc hydroxy phosphite present between 3.25 and 1.95 parts per weight of the dispersion, more preferably between 3.0 and 2.0 parts per weight of the dispersion, more preferably between 2.75 and 2.25 parts by weight and still more preferably at 2.5 parts by weight of the dispersion.

Primers

One or more of the above dispersions may be incorporated into a primer for application to a surface.

General Primer

The percentage amounts given for the preferred components of the primer formulation are the percentage amount in the final primer formulation.

The general primer may be used in the manufacture of specific primers, e.g. a white primer, a metal primer, and a plastic hi fill primer as discussed below. When the general primer is used to manufacture a specific primer it is understood that the components of the general primer are mixed in the amounts specified for the general primer below.

The primers are called "white primer", "metal primer" and "plastic hi fill primer" for ease of reference only, they are not restricted to these specific uses. For example, the "metal primer" may be applied to plastic, ceramic, composite material or other non-metal materials. Similarly the "plastic hi fill primer" may be applied to metal, ceramic, composite material or other non-plastic materials.

General Primer Composition

In addition to one or more dispersion the general primer formulation preferably comprises a primer solvent, a lower alkyl methacrylate polymer, a $C_1$-$C_6$ ketone, a $C_1$-$C_6$ ester, a phthalate ester of a $C_1$-$C_6$ alkylated aromatic alcohol, a polymeric plasticizer and a halogenated polyolefin.

Preferably the primer comprises a primer solvent used as a suspending liquid or vehicle of the primer. A suitable primer solvent is an aromatic hydrocarbon. Preferably the aromatic hydrocarbon is selected from xylol and toluol. Preferably the aromatic hydrocarbon comprises both toluol and xylol. Preferably the primer solvent is present between 39 and 21% of the primer, more preferably between 36 and 24% of the primer, more preferably between 33 and 27% of the primer and still more preferably at 30% of the primer.

Preferably the toluol is between 27.95 and 15.05% of the primer, more preferably between 25.8 and 17.2% of the primer, more preferably between 23.65 and 19.35% of the primer and even more preferably at 21.5% of the primer.

Preferably the xylol is present between 11.18 and 6.02% of the primer, more preferably between 10.32 and 6.88% of the primer, more preferably between 9.46 and 7.74 and even more preferably at 8.6% of the primer.

Preferably the primer includes a lower alkyl methacrylate polymer as described for the general dispersion above. Preferably, the lower alkyl methacrylate polymer is present between 9.1 and 4.9% of the primer, and more preferably, between 8.4 and 5.6%. Preferably still, the lower alkyl methacrylate polymer is present between 7.7 and 6.3%, and even more preferably, the lower alkyl methacrylate polymer is present at 7% of the primer.

The primer preferably includes a $C_1$-$C_6$ ketone selected from propanones, butanones and pentanones. Suitably, the $C_1$-$C_6$ ketone is based on a butanone. Preferably the $C_1$-$C_6$ ketone is present between 29.25 and 15.75% of the primer, more preferably between 27 and 18% of the primer, more preferably between 24.75 and 20.25 and even more preferably at 22.5% of the primer.

More suitably, the $C_1$-$C_6$ ketone comprises both methyl iso butyl ketone and methyl ethyl ketone. Preferably methyl iso butyl ketone is present between 8.06 and 4.34% of the primer, more preferably, between 7.44 and 4.96% of the primer, and more preferably between 6.82 and 5.58% of the primer. Still more preferably, methyl iso butyl ketone is present at 6.2% of the primer.

Preferably, methyl ethyl ketone is present between 21.19 and 11.41% of the primer, more preferably between 19.56 and 13.04% of the primer, and more preferably between 17.93 and 14.67% of the primer. Still more preferably the methyl ethyl ketone is present at 16.3% of the primer.

The primer preferably includes a $C_1$-$C_6$ ester based on methyl, ethyl, propyl and butyl chains. Also suitable are low molecular weight acetates such as diethylether and ethyl acetate. Suitably, the $C_1$-$C_6$ ester is n-butyl acetate. Preferably, the $C_1$-$C_6$ ester is present between 28.08 and 15.12% in the primer. More preferably, the $C_1$-$C_6$ ester is present between 25.92 and 17.28% and even more preferably, between 23.76 and 19.44%. Preferably still, the $C_1$-$C_6$ ester is present at 21.6% of the primer.

Preferably, a phthalate ester of a $C_1$-$C_6$ alkylated aromatic alcohol as described for the general dispersion or 'chip' formulation is used in the general primer formulation. Preferably the phthalate ester of a $C_1$-$C_6$ alkylated aromatic alcohol is present between 0.182 and 0.098% of the primer. More preferably, the phthalate ester of a $C_1$-$C_6$ alkylated aromatic alcohol is present between 0.168 and 0.112%, and more preferably between 0.154 and 0.126% of the primer. Even more preferably the phthalate ester of a $C_1$-$C_6$ alkylated aromatic alcohol is present at 0.14% of the primer.

Preferably the primer includes a polymeric plasticizer selected from non-migratory polymeric plasticizers. Suitably, the polymeric plasticizer is the commercially available polymeric plasticizer Replas 150. Replas 150 is available from Townsend Chemicals, Melbourne, Victoria, Australia.

Preferably, the polymeric plasticizer is present between 1.82 and 0.98% of the primer, more preferably between 1.68 and 1.12%, and more preferably between 1.54 and 1.26%. Preferably still, the chlorinated polyolefin is present at 1.4%.

Preferably the primer comprises a halogenated polyolefin selected from polyolefins containing various percentages of xylene as solids. Suitable halogenated polyolefins include the chlorinated polyolefin 343-3 (50% solids in xylene) and chlorinated polyolefin 153-2 (25% solids in xylene). Suitably, the chlorinated polyolefin is the commercially available chlorinated polyolefin CP 343-3. CP 343-3 and CP 153-2 are manufactured by and available from Eastman Chemical Limited.

Preferably, the halogenated polyolefin is present between 1.3 and 0.7% of the primer, more preferably, between 1.2 and 0.8% and more preferably between 1.1 and 0.9% of the primer. Preferably still, the halogenated polyolefin is present at 1%.

White Primer

The components of the general primer composition may be combined, in the amounts within the ranges specified above, with other components to manufacture a white primer. In addition to the components of the general primer composition the white primer preferably comprises the first dispersion and the second dispersion. All percentage values given for components of the primers are percentages in the primer composition.

Preferably the first dispersion is present between 20.8 and 11.2% of the white primer, more preferably between 19.2 and 12.8% of the white primer, still more preferably between 17.6 and 14.4% of the white primer, and even more preferably at 16% of the metal primer.

Preferably the second dispersion is present between 0.52 and 0.28% of the white primer, more preferably between 0.48 and 0.32% of the white primer, still more preferably between 0.44 and 0.36% of the white primer, and even more preferably at 0.4% of the white primer.

Metal Primer

The components of the general primer composition may be combined, in the amounts specified above, with other components to manufacture a metal primer. In addition to the components of the general primer composition the metal primer preferably comprises the first dispersion, the second dispersion, and the third dispersion.

Preferably the first dispersion is present between 17.94 and 9.66% of the metal primer, more preferably between 16.56 and 11.04% of the metal primer, still more preferably between 15.18 and 12.42% of the metal primer, and even more preferably at 13.8% of the white primer.

Preferably the second dispersion is present between 0.52 and 0.28% of the metal primer, more preferably between 0.48 and 0.32% of the metal primer, still more preferably between 0.44 and 0.36% of the metal primer, and even more preferably at 0.4% of the metal primer.

Preferably the third dispersion is present between 2.73 and 1.47% of the metal primer, more preferably between 2.52 and 1.68% of the metal primer, still more preferably between 2.31 and 1.89% of the metal primer, and even more preferably at 2.1% of the metal primer.

Plastic Hi Fill Primer

The components of the general primer composition, in the amounts specified in the ranges above, may be combined with other components to manufacture a plastic hi fill primer. In addition to the components of the general primer composition the plastic hi fill primer preferably comprises the first dispersion, the second dispersion, an alcohol, a thermoplastic polymer, a polyhydroxy magnesium silicate derivate, and a silicon dioxide powder.

Preferably the first dispersion is present between 16.9 and 9.1% of the plastic hi fill primer, more preferably between 15.6 and 10.4% of the plastic hi fill primer, still more preferably between 14.3 and 11.7% of the plastic hi fill primer, and even more preferably at 13% of the plastic hi fill primer.

Preferably the second dispersion is present between 0.325 and 0.175% of the plastic hi fill primer, more preferably between 0.3 and 0.2% of the plastic hi fill primer, still more preferably between 0.275 and 0.225% of the plastic hi fill primer, and even more preferably at 0.25% of the plastic hi fill primer.

Preferably the alcohol in the primer (the primer alcohol or alcohol solvent) is a $C_1$-$C_6$ aliphatic primary alcohol. Preferably the alcohol is n-butanol. Preferably the alcohol is present between 2.6 and 1.4% of the plastic hi fill primer, more preferably between 2.4 and 1.6% of the plastic hi fill primer, still more preferably between 2.2 and 1.8% of the plastic hi fill primer, and even more preferably at 2% of the plastic hi fill primer.

Preferably the thermoplastic polymer is a thermoplastic polymer as defined for the general dispersion or 'chip' formulation above. Preferably the thermoplastic polymer is the commercially available CAB 381-2 polymer.

Preferably the thermoplastic polymer is present between 0.195 and 0.105% of the plastic hi fill primer, more preferably between 0.18 and 0.12% of the plastic hi fill primer, still more preferably between 0.165 and 0.135% of the plastic hi fill primer, and even more preferably at 0.15% of the plastic hi fill primer.

Preferably the polyhydroxy magnesium silicate derivate is any polyhydroxy magnesium silicate derivate. More preferably the polyhydroxy magnesium silicate derivates is a talc such as CAS No. 14807-96-6 available from Bronson and Jacobs Pty Ltd. Sydney, Australia.

Preferably the polyhydroxy magnesium silicate derivate is present between 12.87 and 6.93% of the plastic hi fill primer, more preferably between 11.88 and 7.92% of the plastic hi fill primer, still more preferably between 10.89 and 8.91% of the plastic hi fill primer, and even more preferably at 9.9% of the plastic hi fill primer.

Preferably the silicon dioxide powder is any silicon dioxide powder. More preferably the silicon dioxide powder is an organically surface treated silicon dioxide power such as Acematt OK 412 available from Degussa.

Preferably the silicon dioxide powder is present between 0.26 and 0.14% of the plastic hi fill primer, more preferably between 0.24 and 0.16% of the plastic hi fill primer, still more preferably between 0.22 and 0.18% of the plastic hi fill primer, and even more preferably at 0.2% of the plastic hi fill primer.

Adhesion Promoter

To promote adhesion of primers to difficult to coat surfaces, such as PE, the surface can be coated with an adhesion promoter, and then coated with the general primer or a specific primer. Preferably the adhesion promoter comprises an aromatic hydrocarbon, a co-polymer of a $C_2$-$C_6$ alkene and a vinyl ester and a chlorinated polyolefin.

The aromatic hydrocarbon preferably comprises all aromatic hydrocarbons including alkylated aromatic hydrocarbons. Preferably the aromatic hydrocarbon is one or both of toluol and xylol. Preferably the aromatic hydrocarbon is present between 95 and 57.75%, more preferably between 90 and 66, more preferably between 85 and 74.25% and still more preferably 82.5% of the adhesion promoter.

More preferably the aromatic hydrocarbon comprises both toluol and xylol. Preferably the toluol is present between 90 and 50.75 and the xylol present between 13 and 7% of the adhesion promoter, more preferably the toluol is present between 87 and 58% and the xylol is present between 12 and 8%, more preferably the toluol is present between 79.75 and 65.25% and the xylol is present between 11 and 9%, and still more preferably the toluol is present at 72.5% and the xylol is present at 10% of the adhesion promoter composition.

Co-polymers of a $C_2$-$C_6$ alkene with a vinyl ester such as ethylene vinyl acetate are used in the adhesion promoter formulation. Suitable co-polymers of $C_2$-$C_6$ alkene with vinyl esters include Elvax 260 available from DuPont E.I. DuPont-de Namours and Co. Inc. Preferably, the copolymer of a $C_2$-$C_6$ alkene with a vinyl ester is present between 3.25 and 1.75% of the adhesion promoter, more preferably between 3 and 2%, more preferably the copolymer is present between 2.75 and 2.25% and even more preferably at 2.5% of the adhesion promoter.

Preferably the chlorinated polyolefin used is the commercially available chlorinated polyolefin 153-2 (25% in xylene). Preferably, the chlorinated polyolefin is present between 19.5 and 10.5% of the adhesion promoter, more preferably between 18 and 12% and even more preferably between 16.5 and 13.5% the adhesion promoter. Still preferably, the chlorinated polyolefin is present at 15% of the adhesion promoter.

Method of Manufacturing Primers

Preferably the primers are made by mixing a first primer solution in a first vessel and mixing a second primer solution in a second vessel and then mixing the first primer solution and the second primer solution together to make the primer. The second vessel may be the same vessel as the first vessel or a different vessel. Preferably other components are mixed together with the first primer solution and the second primer solution to make the primer.

It is understood two or more of the first primer solution, the second primer solution and the other components may comprise the same component, e.g. the same primer solvent. A person of skill in the art understands portioning the components in the first primer solution, the second primer solution and the other components must amount to the total amount required for the primer solution. For example a portion of the component may be added to the first primer solution, a portion of the same component added to the second component and the remainder of the same component added to the other components.

First Primer Solution

Preferably the first primer solution comprises the primer solvent and a lower alkyl methacrylate polymer. All % amounts are % in the first primer solution.

Preferably, the primer solvent of the first primer solution is toluol. Preferably the primer solvent is present in an amount of 71.5 to 38.5% of the first primer solution, more preferably the amount is 66 to 4%, more preferably the amount is 60.5 to 49.5%, and still more preferably the amount is 55% of the first primer solution.

Preferably, the lower alkyl methacrylate polymer is present in an amount of 58.55 to 31.5% of the first primer solution, more preferably the amount is 54 to 36%, more preferably the amount is 49.5-40.5% and still more preferably the amount is 45% of the first primer solution.

Preferably the first solution for mixing the white primer solution and the plastic hi fill primer comprises Plexigum® N743 as the lower alkyl methacrylate polymer. Preferably the first solution for mixing the metal primer comprises Degalan LP65/12 as the lower alkyl methacrylate polymer.

Second Primer Solution

Preferably the second primer solution comprises the $C_1$-$C_6$ ketone, the $C_1$-$C_6$ ester, the phthalate ester of a $C_1$-$C_6$ alkylated aromatic alcohol, and one or more dispersion, all as described above. All % amounts are % amount in the second primer solution.

Preferably, the $C_1$-$C_6$ ketone comprises one or both of methyl isobutyl ketone and methyl ethyl ketone. Preferably the $C_1$-$C_6$ ketone is present in an amount of 35.49 and 19.11% of the second primer solution, more preferably the amount is 32.76 and 21.84%, more preferably the amount is 30.03 to 24.57% and still more preferably the amount is 27.3% in the second primer solution.

If as is preferable, methyl isobutyl ketone and methyl ethyl ketone comprise the $C_1$-$C_6$ ketone, preferably the methyl isobutyl ketone is present in an amount between 20.8 and 11.2% of the second primer solution and the methyl ethyl ketone is present in an amount between 14.69 and 7.91 of the second primer solution, more preferably the amount is between 19.2 and 12.8% methyl isobutyl ketone and between 13.56 and 9.04% methyl ethyl ketone, more preferably the amount is between 17.6 and 14.4% methyl isobutyl ketone and between 12.43 and 10.17% methyl ethyl ketone, and still more preferably the amount is 16% methyl isobutyl ketone and 11.3% methyl ethyl ketone in the second primer solution.

Preferably the $C_1$-$C_6$ ester is present in an amount between 39 and 21% of the second primer solution, more preferably the amount is between 36 and 24%, more preferably the amount is between 33 and 24%, and still more preferably the amount is 30% of the second primer solution.

Preferably the phthalate ester of a $C_1$-$C_6$ alkylated aromatic alcohol is present in an amount between 0.468 and 0.252% of the second primer solution, more preferably the amount is between 0.432 and 0.288%, more preferably the amount is between 0.396 and 0.324%, and still more preferably the amount is 0.36% of the second primer solution.

Preferably the dispersions are included in the second primer solution in amounts that will satisfy the preferable % amounts for the primer solution that is being manufactured. A person of skill in the art is readily able to calculate the amounts based on the percentage values given for the dispersions in the primers above.

Mixing First Primer Solution and Second Primer Solution

The components mixed with the first primer solution and the second primer solution to manufacture the primer solution preferably comprise the $C_1$-$C_6$ ester, the $C_1$-$C_6$ ketone, the primer solvent, the polymeric plasticizer, and the halogenated polyolefin, all of type described above. All % amounts are % amount of the components mixed with the first primer solution and the second primer solution to manufacture the primer solution.

Preferably the first primer solution in an amount between 20.15 and 10.85% and the second primer solution in an amount between 50.31 and 27.09% of the primer solution are mixed to manufacture the primer solution, more preferably the amounts are between 18.6 and 12.4% first primer solution and between 46.44 and 30.96% second primer solution, more preferably the amounts are between 17.05 and 13.95% first primer solution and between 42.57 and 34.83% second primer solution. Still more preferably the first primer solution is present in the final primer in an amount of 15.5% and the second primer solution is present in the final primer in an amount of 38.7%.

Preferably the $C_1$-$C_6$ ester is present in an amount between 13 and 7%, more preferably in an amount between 12 and 8%, more preferably in an amount between 11 and 9%, and still more preferably in an amount of 10%.

Preferably the $C_1$-$C_6$ ketone is present in an amount between 15.6 and 8.4%, more preferably the $C_1$-$C_6$ ketone is present in an amount between 14.4 and 9.6%, more preferably the $C_1$-$C_6$ ketone is present in an amount between 13.2 and 10.8%, and even more preferably the $C_1$-$C_6$ ketone is present in an amount of 12%.

Preferably the primer solvent is present in an amount between 27.95 and 15.05%, more preferably the primer solvent is present in an amount between 25.8 and 17.2%, more preferably the amount is between 23.65 and 19.35%, and even more preferably in an amount of 21.5% of the primer solution.

Preferably the polymeric plasticizer is present in an amount between 1.82 and 0.98%, more preferably in an amount between 1.68 and 1.12%, more preferably the amount is between 1.54 and 1.26%, and even more preferably the polymeric plasticizer is present in an amount of 1.4%.

Preferably the halogenated polyolefin is present in an amount between 1.3 and 0.7%, more preferably in an amount between 1.2 and 0.85%, more preferably in an amount between 1.1 and 0.9%, and even more preferably in an amount of 1.0%.

So that the invention can be understood in more detail, the skilled person is referred to the following non-limiting preferred embodiments.

EXAMPLES

The paintable primer system of the invention comprises a primer containing one or more dispersions or 'chips'. The paintable primer system may also comprise an adhesion promoter.

Example 1

Dispersion Compositions

| First Dispersion ('180/9101 Chip') | | | |
|---|---|---|---|
| Constituents | Trade Names | parts by weight | [1]Range +/− |
| Calcium Carbonate (Synthetic) | Hakuenka CC | 14.8 | 15% |
| Titanium Dioxide | White RCL 575 | 6.3 | 25% |
| Calcium Stearate | Calcium Stearate | 0.4 | 20% |
| Cellulose Acetate Butyrate | CAB 381-2 | 2.1 | 25% |
| Acrylic Polymer | Plexigum ® N743 | 2.1 | 25% |
| Butyl Benzyl Phthalate | Santicizer ® 160 | 0.9 | 25% |
| [2]180/9101 Liquid | | 3.0 | |
| Tallow Diamine Dioleate | | 0.2 | 25% |
| Methyl ethyl ketone | | 2.8 | 30% |

[1]Range +/−: indicates a guide for the percentage range in which the amount of the component may be varied.
[2]Liquid components of the dispersion.

Second Dispersion ('180/9020 Chip')

| Constituents | Trade Names | parts by weight | [1]Range +/− |
|---|---|---|---|
| Titanium Dioxide | Tiona RCL 575 | 25.00 | 15% |
| Cellulose Acetate Butyrate | CAB 381-2 | 6.50 | 25% |
| Butyl Benzyl Phthalate | Santicizer ® 160 | 1.60 | 25% |
| [2]180/9020 Liquid | | 4.05 | |
| Tallow Diamine Dioleate | | 0.25 | 25% |
| Ethanol | | 2.0 | 30% |
| Methyl ethyl ketone | | 0.6 | 30% |
| Isopropyl alcohol | | 1.2 | 30% |

[1]Range +/−: indicates a guide for the percentage range in which the amount of the component may be varied.
[2]Liquid components of the dispersion.

Third Dispersion ('180/9103 Chip')

| Constituents | Trade Names | parts by weight | [1]Range +/− |
|---|---|---|---|
| Calcium Carbonate (Synthetic) | Hakuenka CC | 15.0 | 15% |
| Titanium Dioxide | White RCL 575 | 4.0 | 25% |
| Calcium Stearate | Calcium Stearate | 0.35 | 20% |
| Cellulose Acetate Butyrate | CAB 381-2 | 2.19 | 25% |
| Acrylic Polymer | Degalan ® LP65/12 | 2.19 | 25% |
| Butyl Benzyl Phthalate | Santicizer ® 160 | 0.93 | 25% |
| Rust inhibitor | Nalzin 2 | 2.5 | 25% |
| [2]180/9103 Liquid | | 2.15 | |
| Tallow Diamine Dioleate | | 0.15 | 25% |
| Ethyl Acetate | | 2.00 | 30% |

[1]Range +/−: indicates a guide for the percentage range in which the amount of the component may be varied.
[2]Liquid components of the dispersion.

Example 2

Dry Grinding Process of the Dispersion

The dispersion compositions of Example 1 are produced by the following method. Calcium carbonate, titanium dioxide and calcium stearate are blended into a first vessel. The mixture is wet down with the respective 'Liquid Mixes' or solvents so as to coat the pigment particles prior to milling.

In a second vessel, one or more powdered resin(s) and butyl benzyl phthalate are blended together. In formulating the first and third dispersions, the cellulose acetate butyrate and the acrylic polymer resins are used, whereas the cellulose acetate butyrate resin (only) is used in the second dispersion.

The above premixed compositions are put onto a mill for blending together. The resultant mix of both vessels forms a plasticine type material. This material is taken off the mill in sheet form and cut into small portions, e.g. 160 mm×250 mm. The mill rolls are then completed closed or nipped tightly and the cut sheets are put into the mill. The pre-cut pieces form a thin sheet that is continuously cut off and put back through the nip. The materials are continually ground until all the solvent is driven off, leaving a dry sheet to be taken off the mill. This sheet is then granulated to form a "chip" ready for use in manufacturing a primer.

While using a white pigment, e.g. titanium dioxide in the first dispersion agent is preferred, it is not essential as the second dispersion may also contain a white pigment. Specifically, the white pigment may be optionally and wholly present in a second dispersion to provide a white tinted opaque finish if desired.

As an option to using both the first and second dispersion in a primer, the first dispersion may be used alone, provided an corresponding amount of the cellulose acetate butyrate resin component from the second dispersion is added to the first dispersion formulation.

Advantageously, this novel method of dry grinding to form the dispersion effectively disperses resins and other materials that are otherwise difficult to blend to a suitable fineness state and grinds all the ingredients to result in a solid form. This process provides a high quality lay and flow of the finished primer.

To compare the effectiveness of the traditional bead mill method with that of the dry mill process outlined above, the entire primer containing one or more ingredients was passed through both the traditional bead mill method and the dry mill process. Each primer was sprayed onto a bumper bar. The adhesion achieved by the primer using the traditional bead mill method was similar to that using the dry mill process. However, the primer using the bead mill method showed inferior dispersion and the composition was highly textured and rough. The primer sandpaper finish was found unsuitable for the subsequent application of spray paint. In contrast, the primer produced by the dry mill method dispersed evenly and produced a glass-like finish that could be painted immediately.

The above dry grinding process is contrasted to conventional liquid dispersion 'mill grind' liquid dispersion methods used in other formulations. In this process, the components are dissolved in solvents and plasticisers and the mixture is then passed through a cylinder containing porcelain beads which continuously collide against each another and the material within the vessel. The frictional bead mill action acts to disperse the components within the mixture. However, the degree of component dispersion in the conventional method is lower as compared to that of the present inventors' novel dry mill method.

It may be appreciated by a skilled person that the dispersions may be alternatively produced by the conventional methods of liquid dispersion methods as described above, as well as by known extrusion techniques.

Example 3

Polyethylene Adhesion Promoter Composition

Toluol (50.0%) is heated (65-70° C.) in a water jacket under dry conditions. The solution is left to stand (10 to 15 min), to which is then added resin Elvax 260 (2.5%) with continuous mixing. Once complete solubility is obtained, the mixture is readjusted (by weight) to make up any lost toluol. A mixture of toluol (7.5%) and xylol (25%) is then added. To the cooled mixture is added chlorinated polyolefin CP 153-2 (25% in xylene) (15.0%) and stirred.

Example 4

Primer Composition
White Primer
The weight amounts in brackets below are weight added, the percentage amounts below are % in the primer.

The amounts provided for the components of the primers below are non-limiting examples. The non-limiting examples are provided for guidance and it is appreciated that each of the components can be varied within 30% of the stated amount, more preferably within 25% of the stated amount, more preferably within 20% of the stated amount, more preferably within 15% of the stated amount, more preferably within 10% of the stated amount and even more preferably within 5% of the stated amount.

A person of skill in the art readily understand that when varying the percentage of one or more component the percentage of the other components must be varied accordingly so that the some of the components equals 100%.

Plexigum N743 (44.83 kg, 6.9%) is slowly added to toluol (55.17 kg, 8.5%) and blended (2 min), and the mixture stirred, to form the first primer solution.

In a separate reaction vessel, each of the following is added to a continuously stirred mixture:
methyl iso butyl ketone (11.2 kg, 4.3%)
butyl acetate (21.0 kg, 8.1%)
methyl ethyl ketone (8.0 kg, 3.06%)
butyl benzyl phthalate (Santicizer® 160) (0.36 kg, 0.14%)

To the above solution, both the first dispersion (180/9101 chip) (41.34 kg, 16%) and the second dispersion (180/9020 chip) (1.03 kg, 0.4%) as described above are slowly added to the above mixture and a thickened mixture is obtained.

To the thickened mixture is added the following:
methyl iso butyl ketone (4.8 kg, 1.86%)
n-butyl acetate (9.0 kg, 3.5%)
methyl ethyl ketone (3.27 kg, 1.3%)

The solution is then mixed to form the second primer solution.

The first primer solution and the second primer solution are then combined in a third reaction vessel. The first primer solution is added in an amount to constitute 15.40% of the primer solution, and the second primer solution is added in an amount to constitute 38.70% of the primer solution. The first and second primer solution are mixed while slowly adding:
n-butyl acetate (10.0 kg, 10%)
methyl ethyl ketone (11.90 kg, 11.90%)
toluol (13.0 kg, 13.0%)
a polymeric plasticizer e.g. Replas 150 (1.4 kg, 1.4%)
a halogenated polyolefin e.g. CP 343-3 (1.0 kg, 1.0%)
xylol (8.6 kg, 8.6%)

Metal Primer

The Metal Primer is made as outlined for the White Primer with the components and component amounts adjusted as detailed for the Metal Primer above. As detailed above the Metal Primer contains the first (180/9101), second (180/9020) and third (180/9103) dispersions.

Plastic Hi Fill Primer

The percentage amounts below are % in the plastic hi fill primer. Plexigum N743 (6.0%) is slowly added to toluol (15.95%) and blended (2 min), and the mixture stirred, to form the first primer solution.

In a separate reaction vessel, each of the following is added to a continuously stirred mixture:
methyl iso butyl ketone (6.0%)
butyl acetate (20.0%)
methyl ethyl ketone (15.0%)
butyl benzyl phthalate (Santicizer® 160) (0.15%)
n-butanol (2.0%)
thermoplastic polymer (CAB 381-2) (0.15%)
a polymeric plasticizer (Replas 150) (1.0%)

To the above solution, both the first dispersion (180/9101 chip) (13%) and the second dispersion (180/9020 chip) (0.25%) as described above are slowly added to the above mixture and a thickened mixture is obtained.

When the components of the thickened mixture are completely dissolved to the thickened mixture is added the following:
polyhydroxy magnesium silicate derivate (9.9%)

The solution is then mixed to form the second primer solution.

The first primer solution and the second primer solution are then combined in a third reaction vessel. The first primer solution is added in an amount to constitute 21.95% of the primer solution to an amount of the second primer solution constituting 67.45% of the primer solution. The first and second primer solution are mixed while slowly adding:
silicon dioxide powder e.g. OK 412 (0.20%)
halogenated polyolefin e.g. CP 343-3 (1.0%)
xylol (9.4%).

The present invention provides for a paintable primer system suitable for applying to various surfaces. For example, application of both the adhesion promoter followed by the primer is suitable for application to PE substrates.

Alternatively, the primer may be applied (alone) to PP and other plastic substrates and to metals and composite materials including metals and composite materials used in the auto, marine and aviation industries without the need for the adhesion promoter and still provide high adhesion to the substrate. Advantageously, the primer is flexible and is able to be tinted. In this way, the tinting assists the spray painter by permitting less topcoat paint required due to the coverage of the primer.

Inclusion of the third dispersion in a primer allows the primer to satisfactorily adhere to metals and composite materials, more specifically metals and composite materials used in the auto, marine and aviation industries. Primers including the third dispersion will accommodate the aviation industry, the marine industry and the automotive industry. Primers including the third dispersion provide sufficient adherence to metal surfaces of new panels and already painted panels. Before application of a primer comprising the third dispersion a panel surface should first be wiped down with a prepsol or cleaning solvent.

Example 5

Method of Use

The adhesion promoter is shaken and strained prior to application. The surface to be coated, e.g. PE is wiped thoroughly with a cleaning solvent or thinners, e.g. acetone or acrylic thinners. The cleaning solvent or thinners are flashed off or removed with a clean cloth. Two medium wet coats of the adhesion promoter are applied, allowing 60 seconds flash off between each adhesion promoter coat. The polyolefin surface is heated, preferably by baking (e.g. 45 min, 45° C.). Although this baking or 'curing' step is not essential, it is preferred as it accelerates a cross linking effect of the adhesive promoter to the polyolefin surface. The polyolefin surface is cooled to room temperature.

The primer containing one or more solid dispersions or 'chips' is shaken (ca. 30 seconds), strained and 1 or 2 medium primer coats applied, allowing one minute flash off time between each application. If desired, a longer period (e.g. 10 minutes) to dry before scuffing or sanding prior to painting to achieve a higher finish may be used. The polyolefin is now suitably prepared for painting with a top coat. Suitable top coats are selected from coloured tint or paint, antifouling paint agents or other top coats, e.g. acrylics, two-pack polyurethanes, polyesters or cellulose based resins.

The primers may also be used on surfaces without the use of the adhesion promoter.

Example 6

Adhesion Performance Evaluations

The crosshatch and tape peel test of ASTM D3359-87 was used to determine paint adhesion to a PE substrate. This test involves cutting the painted substrate with a sharp bladed instrument (e.g. razor blade). Vertical (e.g. 10) and horizontal lines (e.g. 10) are cut, resulting in 100-2 mm squares or boxes, patterned by the cutting. Threaded adhesive tape is adhered to the cut portions and the blunt edge of the blade is rubbed over the tape insuring that the tape totally adheres to all the formed boxes. The tape is removed with a quick motion. The number of boxes removed by the tape determines the level of adhesion. A 5% loss is acceptable and can be classified as total adhesion.

Tests using the adhesion promoter and primer applied to PE substrates showed a 3% and 0% loss after 24 and 48 hours respectively. Tests using the metal primer applied to metal substrates (stainless steel, mild steel, aluminium, electroplated mild steel (automotive new panels)) showed a 0% loss after 24 and 48 hours.

Accelerated Weather Tests

Accelerated Weather Tests were completed on a test PE substrate using standard testing methodologies (Architectural & Industrial Coatings, Penrith, Australia). In the tests, 500 hours equated to 4 years of weathering to access deterioration in adhesion loss caused by weathering. The tests showed that the adhesion of the white primer to the PE had not been affected by the test weathering process.

The cross-hatch method was performed and showed zero loss of adhesion after 4 years of accelerated weathering.

Field Testing

Experimental field testing was performed on PE truck bull bars travelling continuously across a hostile environment, i.e. the Nullabor Desert. These trucks have sustained multiple impacts with wild fauna, e.g. kangaroos, road side posts and various airborne objects, e.g. stone chips. Analysis of the paint integrity showed no observable paint flaking on or around impacted areas.

Advantageously, the paintable primer system of the present invention may be applied to existing PE substrates and need not be incorporated at the time of article manufacturing, i.e. it may be applied to existing goods.

Application of the present paintable primer system may be found in various fields.

The paintable primer system is suitable for application to PE substrates in the form of water buoys, boats, exterior shells of cars including concept cars and automotive parts such as bull bars, bumper bars, non-metallic 'smart bars' and any plastic components of semi-trailers, horse floats and similar vehicles, inclusive of the side mirrors.

Further application of the paintable primer system may also be found in other manufactured PE devices, such as marketing or exhibition displays suitable for commercial and retail markets. Currently, such displays have colour introduced when the substrate is rotormoulded, however, the colouring is inferior by way of smoothness or finish. Hence it is contemplated that such PE displays and the like may be painted using the present paintable primer system and provide an 'automotive' quality finish, thus enabling the company a stronger visual marketing advantage over any other.

Presently, the rapid growth of the algae requires continuous maintenance by way of antifoul coating on objects such as vessels and water buoys which are continuously exposed to algae in marine environments. If this maintenance is not carried out, buoys become unbalanced, thereby reducing visibility and hence safety. Algal growth decreases the performance of speedboats and the like through surface drag.

Until now, PE water buoys and water vessels have been unable to be successfully coated with an antifouling agent due to poor adherence of either an antifoul coating or paint. Thus it may be readily apparent that the paintable primer system may be used to carry antifouling agents to objects such as boat hulls and buoys. Further advantageously, waterway buoys may be painted to give them a brighter appearance than that obtained by conventional tint moulding to enhance safety.

The paintable primer system is also suitable for application to metals and composite materials such as metals and composite materials used in the auto, marine and aviation industries.

It may be appreciated by the skilled person that the above composition may be varied to accommodate various formulation conditions such as temperature and humidity which may influence solubilities within the mixtures. It may also be appreciated that the present paintable primer system may be used to coat non plastic substrates such as gyprock, concrete, metals, ceramics.

It will be appreciated by the skilled person that the present invention is not limited to the embodiments described in detail herein, and that a variety of other embodiments may be contemplated which are nevertheless consistent with the broad spirit and scope of the invention.

What is claimed is:

1. A dispersion comprising a thermoplastic cellulose polymer or a derivative thereof, a phthalate ester of a $C_1$-$C_6$ alkylated aromatic alcohol, an alkaline earth metal salt of a $C_9$-$C_{20}$ aliphatic fatty acid, a surfactant, a $C_1$-$C_4$ alkyl methacrylate polymer and a solvent, wherein the dispersion adheres to a substrate selected from the group consisting of a plastic, a metal and a composite when applied to said substrate as part of a primer.

2. The dispersion of claim 1 further comprising a white metal oxide.

3. The dispersion of claim 1, wherein the $C_1$-$C_4$ alkyl methacrylate polymer is an ethyl methacrylate polymer.

4. The dispersion of claim 1 further comprising a metal carbonate and a white metal oxide.

5. The dispersion of claim 1 further comprising a metal carbonate, a white metal oxide and a rust inhibitor.

6. The dispersion of claim 1 in a solid form.

7. The dispersion of claim 4 in a solid form.

8. The dispersion of claim 5 in a solid form.

9. The dispersion of claim 6 in a granulated form.

10. The dispersion of claim 7 in a granulated form.

11. The dispersion of claim 8 in a granulated form.

12. A primer comprising the dispersion of claim 1 and, a primer solvent.

13. The primer of claim 12 further comprising one or more components selected from the group consisting of: a $C_1$-$C_6$ ketone, a $C_1$-$C_6$ ester, a polymeric plasticizer and a halogenated, polyolefin.

14. The primer of claim 13 further comprising one or more components selected from the group consisting of: an alcohol, a polyhydroxy magnesium silicate derivate, and a silicon dioxide powder.

15. A primer comprising a primer solvent, a $C_1$-$C_4$ alkyl methacrylate polymer, a $C_1$-$C_6$ ketone, a $C_1$-$C_5$ ester, a phthalate ester of a $C_1$-$C_6$ alkylated aromatic alcohol, a polymeric plasticizer, a halogenated polyolefin and the dispersion of claim 4.

16. The primer of claim 15 further comprising the dispersion of claim 5.

17. The primer of claim 15 further comprising an alcohol, a thermoplastic cellulose polymer or a derivative thereof, a polyhydroxy magnesium silicate derivate and a silicon dioxide powder.

18. A method of manufacturing a primer including the steps of:
    mixing a first primer solution comprising a primer solvent and a $C_1$-$C_4$ alkyl methacrylate polymer in a first vessel;
    mixing a second primer solution comprising the dispersion of claim 6 in a second vessel; and
    mixing the first primer solution and the second primer solution together to form the primer;
    wherein the primer adheres to a plastic, a metal and/or a composite substrate.

19. A method of manufacturing a primer comprising:
    mixing a first primer solution comprising a primer solvent and a $C_1$-$C_4$ alkyl methacrylate polymer;
    mixing a second primer solution comprising a $C_1$-$C_6$ ketone, a $C_1$-$C_6$ ester, a phthalate ester of a $C_1$-$C_6$ alkylated aromatic alcohol, and the dispersion of claim 7; and
    mixing the first primer solution and the second primer solution together with a primer solvent, a $C_1$-$C_6$ ketone, $C_1$-$C_6$ ester, a polymeric plasticizer and a halogenated polyolefin to form the primer;
    wherein the primer adheres to a plastic, a metal and/or a composite substrate.

20. The method of manufacturing a primer of claim 19 wherein the second primer solution further comprises a rust inhibitor.

21. A method for coating a surface of an article comprising:
    coating the surface with an adhesion promoter comprising an aromatic hydrocarbon, a co-polymer of a $C_2$-$C_6$ alkene and a vinyl ester and a chlorinated polyolefin; and
    coating the surface with the primer of claim 12 or claim 15.

22. An article coated with the primer of claim 12 or claim 15.

23. The dispersion of claim 1 further comprising one or more component selected from the group consisting of: a metal carbonate; a white metal oxide and a rust inhibitor.

24. The dispersion of claim 1 wherein the dispersion adheres to a substrate selected from the group consisting of a polyethylene, a polypropylene, a polystyrene, a thermoplastic elastomer and an etheylene propylene rubber when applied to said substrate as part of a primer.

\* \* \* \* \*